Feb. 11, 1969   J. O. PROHASKA   3,426,388
SPONGE RUBBER PADDING
Filed Feb. 10, 1965   Sheet 1 of 2
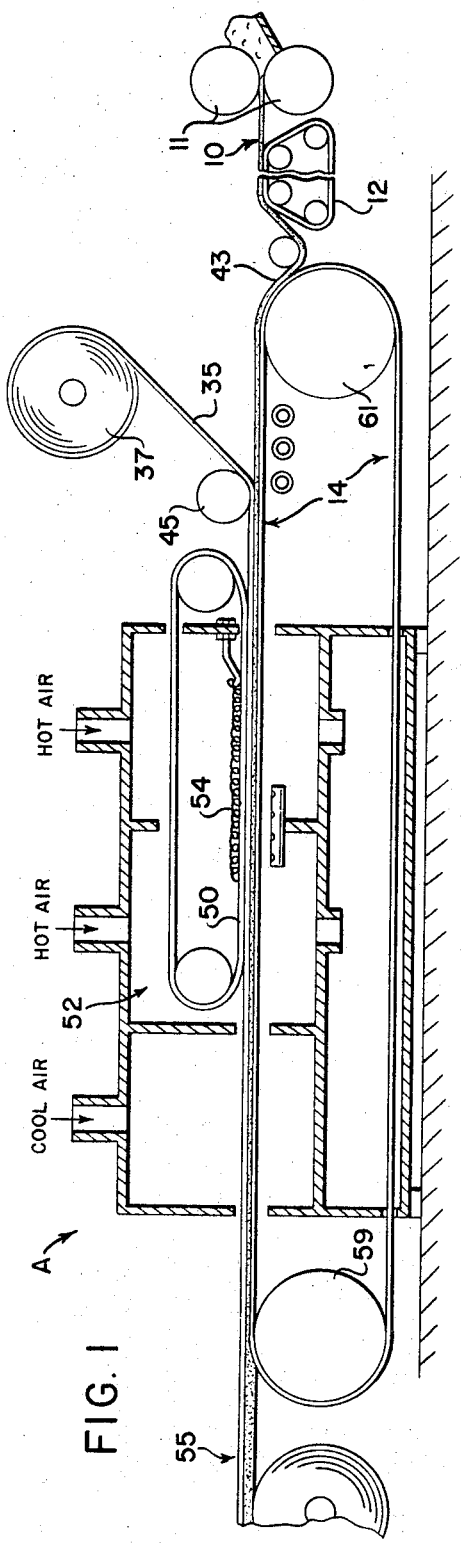
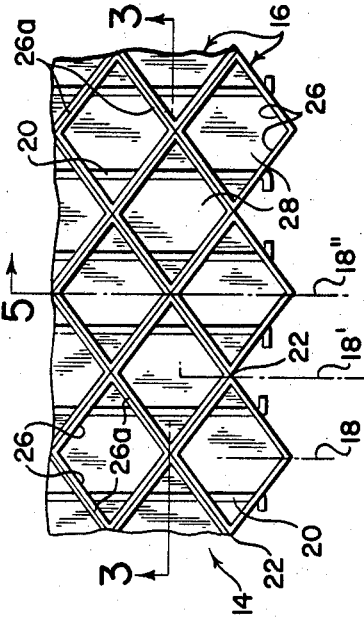
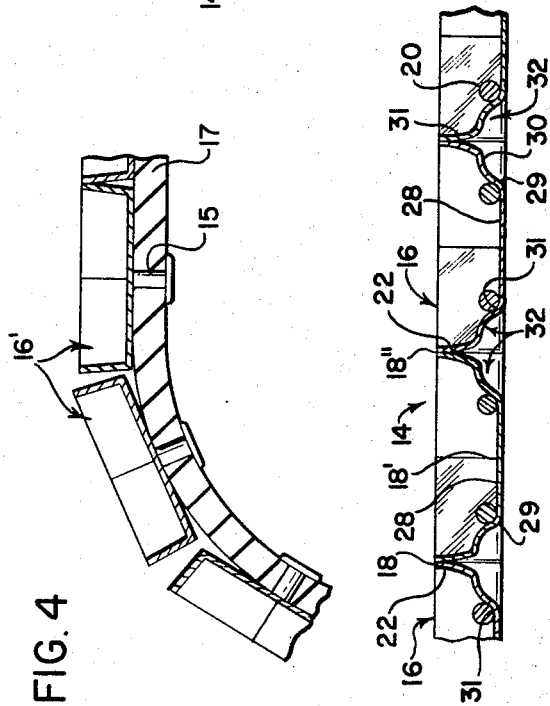
INVENTOR.
JOHN O. PROHASKA
BY Tilberry & Body
ATTORNEYS Feb. 11, 1969  J. O. PROHASKA  3,426,388
SPONGE RUBBER PADDING Filed Feb. 10, 1965

INVENTOR.
JOHN O. PROHASKA
BY Tilberry & Body
ATTORNEYS

United States Patent Office 3,426,388
Patented Feb. 11, 1969

3,426,388
SPONGE RUBBER PADDING
John O. Prohaska, San Clemente, Calif., assignor to Orcco Industries, Inc., Los Angeles, Calif., a corporation of California
Filed Feb. 10, 1965, Ser. No. 431,516
U.S. Cl. 18—4                           8 Claims
Int. Cl. B29c 1/16

ABSTRACT OF THE DISCLOSURE

An endless conveyor belt consisting of individual mold cups having each a bottom and side walls, the cups being in close association with each other throughout the upper and lower parallel portions of the belt so as to form a substantially continuous and uninterrupted belt surface, the walls of the individual cups being hinged together by hinge pins so that they can pass over drums at opposite ends of the belt.

---

The present invention pertains to the art of sponge rubber padding and more particularly to a molded sponge rubber padding and apparatus for making same.

The present invention is particularly applicable to sponge rubber padding for use as a carpet underlay and it will be described with particular reference thereto; however, it is to be appreciated that the invention has much broader applications and may be equally applied to sponge rubber padding used for other purposes.

Carpet underlay has long taken the form of a flat sheet of blown sponge rubber having a fabric backing adhered thereto which is produced by laying a sheet of unblown rubber onto a flat conveyor and pressing a coarse meshed fabric into the top of the rubber sheet either before or during the blowing and curing operation thereof.

More recently, such underlay was produced by laying a sheet of unblown sponge rubber onto an open grid-like member, such as an open meshed conveyor belt, having spaced narrow supporting surfaces and openings therebetween so that the sponge rubber sags naturally into the openings to form a plurality of spaced downwardly extending and rounded protrusions or buttons. The rubber thus has a waffled or corrugated construction. As the rubber sagged, an open meshed fabric was laid on the rubber so as to extend across the valleys of the corrugations and rest on the peaks thereof. This fabric was adhered to these peaks as before, by pressing the fabric sheet into the sponge rubber, either before or during the blowing and curing thereof and became a backing for the underlay giving it lateral strength.

More recently, and as described in patent application Ser. No. 291,494, filed June 28, 1963, assigned to the assignee of this application, the open meshed fabric backing sheet was made gas impervious by calendering into its interstices a sheet of non-blowing rubber. With this arrangement, expanding gases escaping from the blowing sponge rubber into the valleys of the corrugations are trapped and force the rubber downwardly a greater distance than would otherwise be the case. The buttons or protrusions are hollow and define with the backing sheet a generally closed cavity.

In either event, the outer surfaces of the protrusions or buttons are generally rounded (in the shape of a catenary) and substantial portions of the surface are at a substantial angle to the vertical. Thus the buttons are weak mechanically in this vertical direction. Also the surfaces of the buttons or portrusions have an unsightly textured surface. Further obtaining a uniform vertical dimension on all of the protrusions is quite difficult.

A still further problem of prior processes was that only atmospheric pressure opposes the expansion of the sponge rubber resulting in a product having different and inferior physical properties to the same compound cured under pressure in a hydraulic press or in a closed cavity.

A further problem, emphasized by the present invention, was that the sponge rubber when curing was exposed to a hot oxygen-bearing atmosphere similar to that used in one of the most severe age resistance tests used on rubber products. Thus, in heated platen press curing systems, air is carried into the curing unit by the movement of the rubber. In oven curing systems, the oxygen content of the air is somewhat reduced through the use of combustion byproducts of the heating units, but a damaging amount of oxygen is always brought into the oven in the form of fresh air makeup.

In either event, the result was that by the time the rubber has been vulcanized and cured, it has also been subjected to the equivalent of an accelerated aging process. The result was reduced age resistance, loss in resilience, and tear and crack resistance.

A further difficulty with prior processes has been that the sponge rubber had to be specially compounded to not only sag rapidly under the force of gravity but to then have a blow and cure rate which would match the rate of sag.

To obtain these characteristics required a very careful balancing of all the ingredients in the rubber and often other desirable characteristics in a sponge rubber padding had to be sacrificed to obtain this balancing.

The present invention contemplates a new and improved device for making sponge rubber padding which overcomes all of the above referred to difficulties and others and provides a padding wherein the hollow protrusions have outer surfaces which have been protected from hot gases during the vulcanizing process, which are in fact molded, which may be shaped or angled as desired, and which have an improved surface texture.

The invention also contemplates a conveyor belt and which overcomes all of the above referred to difficulties and enables the shape, size and depth of the buttons or protrusions to be accurately and consistently controlled while at the same time protecting the surfaces of the vulcanizing or curing rubber from hot oxygen bearing gases.

The principal object of the present invention is the provision of a device for making a sponge rubber padding which is economical to manufacture, easy to install and durable in use.

A further principal object of the present invention is the provision of a device for the making sponge rubber padding having increased resiliency per square inch for a given weight of sponge rubber used.

Still another object of the present invention is the provision of device for making an improved carpet underlay having buttons or protrusions extending from one side which have a generally flat bottom surface and substantially vertical sidewalls.

Still another object of the invention is the provision of a new and improved device for making carpet underlay manufactured from a blowable sponge rubber compounded not to balance the sagging, cure and blow rates, but to provide a firmer, lighter, more resilient and more durable product.

Still another object of the invention is the provision of a new and improved device for making carpet underlay of blown sponge rubber wherein the rubber during the vulcanizing and curing process has been exposed to none or a minimum amount of hot oxygen bearing gases.

Still another object of the invention is the provision of a new and improved belt for the manufacture of sponge rubber underlay which permits the use of tougher, more resilient base polymers, reinforcing pigments and faster curing systems than will work with the present "gravity sag" systems of curing.

Still another object of the invention is the provision of a new and improved conveyor belt for making carpet underlay having a plurality of protrusions or buttons comprised of a plurality of individual mold members relatively articulated to form such buttons or protrusions to a definite size and shape.

Another object of the invention is the provision of a new and improved belt for manufacturing carpet underlay having a plurality of buttons or protrusions on one surface thereof which enables positive pressure control of a relatively high order on the unvulcanized stock during the curing process.

Another object of the invention is the provision of a device for making carpet underlay wherein each individual button or protrusion is molded under a pressure somewhat greater than atmosphere.

Another object is to provide a belt for manufacturing sponge rubber underlay wherein curing takes place in an environment which substantially protects it from oxidation damage.

Another object of the invention is the provision of a new and improved dual purpose conveyor belt for use in the manufacture of sponge rubber padding wherein the belt in one position enables the manufacture of sponge rubber padding having a plurality of buttons or protrusions on one side and when turned over enables the manufacture of flat sponge rubber products.

Still another object of the present invention is the provision of an improved conveyor belt for making such improved padding whereby individual molds are used to form buttons or protrusions of a definite size and shape in the padding.

Still a further object of the invention is to provide such an apparatus in which a plurality of such molds are hingeably connected in transverse rows to form an endless belt for transporting the uncured rubber sheet through a heated space.

In accordance with the present invention, sponge rubber padding is provided comprised of a plurality of cupped protrusions or buttons of a distinct outer molded shape each having generally vertically extending sidewalls, a generally flat base and integrally joined at the upper edges.

Further in accordance with the invention, an elongated coveyor belt is provided particularly adapted for carrying a thin sheet of unblown sponge rubber through curing apparatus comprised of a large number of individual upwardly facing mold cups arranged in transverse and longitudinal rows so as to form a continuous network of discrete upwardly facing mold cavities and means supporting the cups for relatively articulated movement so that they comprise an endless belt.

Further in accordance with the invention, each such mold cup has a generally flat bottom wall and substantially straight and vertical sidewalls and is of a shape allowing arrangement of the mold cups in generally contacting side-by-side relationship to form a substantially continuous regularly recessed surface across the entire width and length of the belt.

Further in accordance with the invention, adjacent transverse rows of mold cups overlap in a longitudinal direction and the hinge means include a transversely extending rod member extending through the walls of the cups.

The present invention may take physical form in certain shapes and configurations of carpet underlay, in certain shapes and configurations of a conveyor belt, making possible certain steps and combinations of steps in the process of manufacure, preferred embodiments of which will be described in this specification and illustrated in the accompanying drawings in which:

FIGURE 1 is a somewhat schematic side cross-sectional view of apparatus capable of manufacturing padding according to the present invention;

FIGURE 2 is an enlarged plan view of a portion of the belt illustrating a preferred embodiment of the invention showing the hinge arrangement of successive transverse rows of molds;

FIGURE 3 is a cross-sectional view taken along lines 3—3 of FIGURE 2;

FIGURE 4 is a fragmentary cross-sectional view of an endless belt mold showing an alternative embodiment of the present invention;

Figure 5:
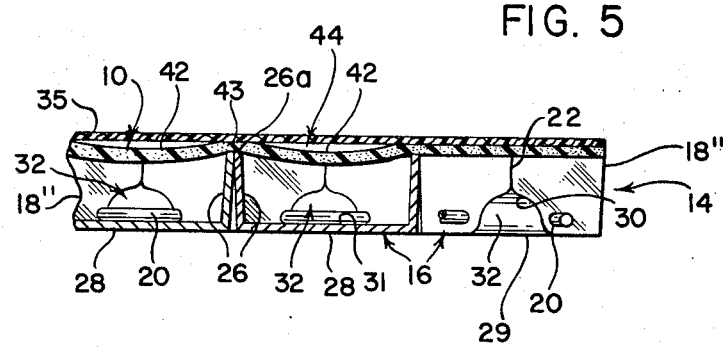
FIGURE 5 is an illustration showing the relationship of the composite rubber sheet and the belt mold prior to blowing the sponge rubber sheet, taken on the line 5—5 of FIGURE 2.
Figure 6:
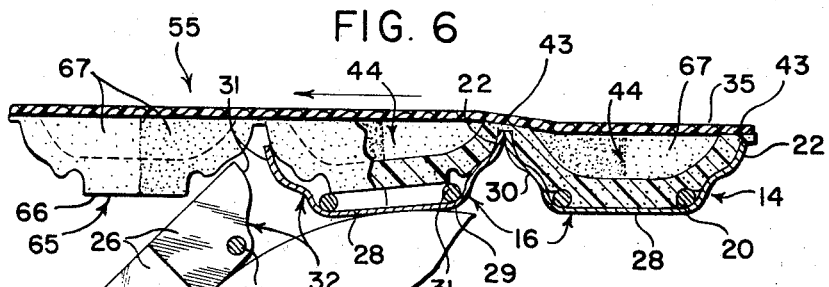
FIGURE 6 is an illustration representing the progressive separation of the belt mold from the finished sponge rubber sheet in accordance with the invention.

Referring now to the drawings wherein the showings are for the purpose of illustrating a preferred embodiment of the invention only and not for the purpose of limiting same, FIGURE 1 shows a thin sheet of uncured, unblown sponge rubber 10, compounded with conventional and necessary blowing and curing agents, being fed from calender rolls 11 onto an auxiliary conveyor belt 12 and then onto an endless main conveyor belt 14 constructed in accordance with the invention. This belt 14 as shown passes through a source of heat such as an oven 52, then over a roller or drum 59 from where it returns to the entrance end of the oven over a second drum or roller 61 and then starts through the oven again.

Figure 7:
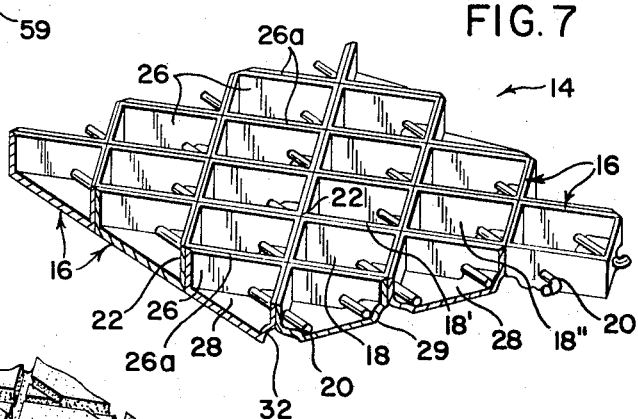
FIGURE 7 is a fragmentary perspective view of the assembled belt.

In accordance with the invention, the belt 14 as best shown in FIGURES 2, 3 and 7 is comprised of a plurality of individual upwardly opening, cup-like mold members 16 arranged in side-by-side relationship both transversely and longitudinally of the belt and so pivoted or hinged relative to each other in a longitudinal direction that the belt can pass around the rollers or drums at each end of the oven 52. Preferably these mold members 16 are arranged in a plurality of transverse rows 18, 18', 18'' in side-by-side relationship to form a generally continuous upwardly facing surface on which the sheet of sponge rubber can be supported as it moves through the oven.

Each mold member 16 may take any shape or combination of shapes lending itself to arrangement in a close adjacent relationship, such as squares, rectangles, hexagons or star shapes; but in the preferred embodiment, each mold member in top or plan view generally has a diamond shape defined by generally straight vertically extending sidewalls 26 integral with a flat bottom wall 28 such that each mold member opens upwardly to define a mold cavity of generally diamond shape.

Adjacent rows 18 of the mold members 16 may be movably associated so as to pass around the rolls 59, 61 in any desired manner. Preferably, they are hingedly or pivotedly interconnected and in the embodiment shown, the mold members 16 are arranged so that one diagonal is parallel to the length of the belt and the other diagonal extends transversely thereof and the individual rows 18 overlap in a longitudinal direction with the sidewalls 26 of one row parallel to and substantially abutting the sidewalls 26 of the adjacent row. A rod 20 extends transversely of the belt through suitable transversely aligned openings provided in the sidewalls 26. The openings are preferably located halfway between the transverse diagonal and the longitudinal end 22 of each mold member 16 and are closely adjacent to the flat bottom wall 28 so that the belt hinges in its bottom plane. With this arrangement, each row 18 is pivotally connected to its immediate adjacent row. The parallel closely spaced upper edges 26a of the sidewalls 26 form grid like surface onto which a sheet of rubber to be cured is fed.

Alternatively, the members 16' may be movably associated by attaching them individually to a flexible continuous belt 17 as for example by means of a rivet or stud 15 fastened to the center of the bottom of each cup and extending into or through the belt.

Referring again to FIGURES 2, 3 and 7, base 28 and sidewalls 26 forming the longitudinal ends 22 of each mold member 16 are so formed as to provide a relief 32 between adjacent rows and to enable the rows to pivot or hinge relative to each other as they pass around the rollers 59, 61. Thus the base 28 at its longitudinal ends curves upwardly as at 29 and then longitudinally as at 30 and then upwardly at a slightly divergent angle as at 31 to the top edge 26a. The curve 29 is so located longitudinally that the inner surface 31 is generally coaxial within close contact with the corresponding portion of the surface of rod 20. This prevents the sponge from blowing between these surfaces and locking itself to the belt. The rods 20 are shown as round but they can be otherwise shaped as to closely mate with the inner surface of the cup. The sidewalls 26 also preferably diverge slightly in an upward direction to provide a draft for facilitating removal of the rubber after it has been molded in the mold cavity. The bottom surface 28 may have suitable decorative designs, not shown, embossed therein.

The size of the individual mold members 16 depends upon a number of various factors such as the plasticity of the blowable rubber sheet 10 and the ultimate configuration of the lower surface of the carpet underpadding to be manufactured on the belt. In the preferred embodiment, however, each mold member 16 is approximately ¾ of an inch on a side and approximately ¼ of an inch deep. Obviously, these dimensions may be varied without departing from the invention.

The hinge or rod member 20 extends transversely through all of the mold members 16 in one row and the ends thereof may be bent at right angles or other means may be provided on such ends to prevent their longitudinal displacement from the belt.

In the manufacture of carpet underlay in accordance with the present invention and using the belt 14 of the invention, it will be appreciated that the belt 14 moves continuously through the oven and returns around the rolls 59, 61. The blowable rubber sheet 10 is calendered to a predetermined thickness by the rolls 11 and is also warmed thereby to a soft and tacky condition.

The sheet 10 supported by the belt 12 moves from the rolls 11 to the belt 14 and first comes into supporting contact with the upper edges 26a of the members 16 as shown at 43. Because of its soft and tacky condition, the sheet 10 immediately begins to sag into the cavities of the members 16 as at 42. The sheet 10 then moves with the belt under a backing sheet 35 which is fed continuously from the sheet 10 from a supply roller 37 at a speed corresponding to the velocity of the belt 14. The backing sheet 35 engages the upper surface of the supported portion 43 and is spaced from the sagging portions 42.

The backing sheet is preferably non-porous and in the preferred embodiment, is comprised of an open meshed fabric and a thin sheet of non-blowing rubber calendered thereinto as it is described in application Ser. No. 291,494 and assigned to the assignee of this application. A feed or pressure roll 45 bears against the upper surface of sheet 35 and presses it downwardly to insure full engagement with all the portions 43 which being tacky adhere to the sheet 35. The depressions 42 now define a plurality of closed cavities 44. The pressure caused by the roll 45 is so controlled that it does not cut through the sheet 10 at the peripherally supported portions 43.

The sheets 10 and 35 and the belt 14 then move under a pressure belt 50, moving at the same speed. This belt 50 rests on the upper surface of the sheet 35 and lightly holds it in pressure engagement with the portions 43 while the whole assembly moves into the heated oven 52.

Within the oven 52, additional means are provided for maintaining the pressure of the belt 50 onto the upper surface of the sheet 35. Such means may take a number of different forms, but preferably such means take the form of a drag belt 54 resting on top of the pressure belt 50 and prevented from movement therewith by any suitable means. The combination of the two weights insures that a substantially gas-tight seal is maintained between the portions 43 and the sheet 35 during the curing operation.

As the sheets 10, 35 continue to move through the oven, they are further heated. The rubber in the sheet 10 sags even more into the cavity of the members 16. At the same time the rubber of the sheet 10 is heated to a temperature such that the blowing compounds contained therein begin to evolve a gas. This gas causes the rubber to expand. Some of the gas escapes into the cavity 42 which, as above pointed out, is closed. This gas is thus trapped and forces the rubber in the sheet 10 downwardly and outwardly into a pressure engagement with the inside surfaces of the members 16.

While the exact pressure created is not known, it is known that it is sufficient to slightly densify the external surface on the rubber in engagement with the surfaces of the members 16 and to in effect give to the rubber a slight skin. Also and more importantly, the rubber, instead of expanding outwardly simply against air pressure, instead takes on a characteristic similar to that when expanded into a mold.

Tests have shown that the same compound cured on a conventional open woven wire belt is considerably inferior in compression deflection characteristics than the compound molded while it is being cured as above described.

Figure 8:
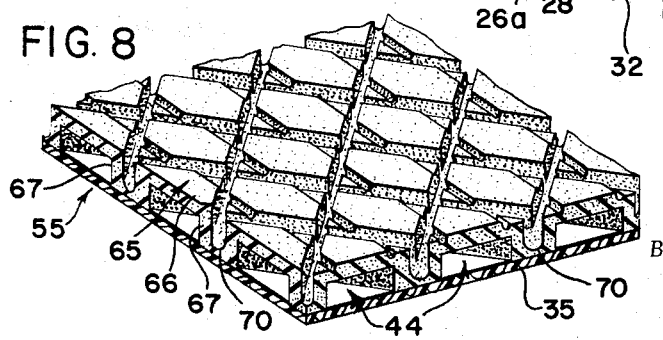
FIGURE 8 is a fragmentary perspective view of the finished underlay.

The curing compounds contained in the rubber of sheets 10 and 35 now begin to take effect and the now blown and shaped material of sheet 10 and the rubber of sheet 35 cure to the shape shown in FIGURE 8 with the sheet 35 firmly adhered to the portions 43.

After the curing and blowing operation just described is completed, the belt 14 moves the sheets 10 and 35, now indicated as padding 55, from beneath the pressure belt 50 and thereafter the padding 55 is removed from the belt 14, cooled and wound into rolls for shipment.

The belt 14 then passes downwardly around the drum 59 and moves back to the entrant end of the oven 52 then surrounds drum 61 and is then again in the position to accept the uncurred rubber sheet from conveyor belt 12.

It will be appreciated that in some instances the backing sheet 35 may be omitted, assuming that its lateral strength is not needed or the backing sheet 35 need not go through the oven with the sheet 10 but instead, may be cemented to the blown sponge rubber after the rubber has completely cured and even cooled. Also a simple fabric without any rubber filling its interstices may be employed. In any of such events, the belt 50 should then be gas impervious so that the gases released by the blowing rubber are still trapped within a cavity now formed by the sagging rubber portions 42 and the lower surface of the belt 50. The belt 50 should preferably be made of a gas impervious material such as silicon rubber coated fiberglass felt and/or it should be coated with an antiadherent, e.g., talcum, to prevent it from sticking to the portions 43 when it comes into contact therewith.

While the general structure of the apparatus A forms no part of the present invention, the belt 14 used with the apparatus is an essential part thereof. Sponge rubber padding made in accordance with the invention will have, when viewing it from the bottom side, a plurality of discrete buttons or projections 65 of blown, cured rubber having an outer surface corresponding to the shape of the inside of the members 16 and defined by a generally flat bottom 66 and generally straight vertically extending sidewalls 67. The sidewalls 67 of adjacent buttons 65 are generally parallel and spaced a distance apart equal to the thickness of the abutting sidewalls 26 of the mold members 16. The outer surface of the buttons 65 have a distinct appearance of having been molded and as such have what may be referred to as a slight skin. All buttons are of exactly the same vertical height, although if members 16 of varying heights are employed, the buttons would have a similar variation in height. The flat bottom 66 is interrupted across one corner by a depression or groove resulting from the rods 20 which pass on the inside of the members 16.

It will be appreciated that if members 16' of the type shown in FIGURE 4 are employed, then this last mentioned bottom surface irregularity need not be present.

The buttons 65 are integrally joined by a thin web 70 at the upper end of a sidewalls 67. This web generally has been prevented from blowing by the weight of the belt 50 and is of somewhat denser rubber. In the padding of the preferred embodiment, the sheet 35 is adhered to the upper surface of this web 70 so that viewed from the top, the padding 55 of the preferred embodiment has a continuous flat surface, but the padding itself has a plurality of sealed cavities immediately under this sheet 35 and otherwise defined by the buttons 65. Absent the sheet 35, the sponge rubber itself underneath is made up of a series of upwardly facing concavities.

It will thus be seen that embodiments of the invention have been described which accomplish all of the objects of the invention heretofore set forth and others and that a carpet underlay and a belt have been described which are novel and produce highly improved results.

In particular, such results may be generally defined as a carpet underlay having a plurality of buttons all of a uniform vertical thickness, all having a generally flat bottom surface, all having generally vertical sidewalls, all having the lower exposed surfaces with a molded texture and contour which are pleasing in appearance.

Also, the rubber employed, instead of being compounded as a balancing of sagging, blowing and curing characteristics, can be compounded to give maximum resilience and maximum life. It will be apparent that the rubber itself during the course of curing has been exposed a minimum amount to hot oxygen bearing gases and therefore should have a maximum life and highly improved other characteristics.

Having thus described my invention, I claim:

1. A conveyor belt for making a sponge rubber padding from a blowable uncured rubber sheet comprising;

a plurality of individual mold cups having each a bottom and side walls extending from the bottom outwardly, said cups being arranged in transverse and longitudinal rows so as to define a network of separate outwardly opening mold cavities, the walls of said cups being in positions of close face to face relationship with respective walls of adjacent cups when all said cups are in upwardly facing position, whereby said cups provide a substantially continuous and uninterrupted upper belt surface, and hinge members extending through walls of laterally adjacent cups hingeably interconnecting said transverse mold rows so as to form an endless flexible belt mold comprising mold cups adapted to be received on and driven by spaced drums at opposite ends of said belt.

2. A belt according to claim 1 wherein each said mold cups has a flat bottom wall and substantially vertical sidewalls and is of a shape allowing arrangement of the mold cups in complementry fashion to form a substantially continuous surface.

3. A belt according to claim 1 wherein adjacent transverse mold rows longitudinally overlap such that each mold member of one row overlaps with each mold member of the adjacent row and such hinge means includes a rod member loosely extending through the walls of the overlapping molds.

4. A belt according to claim 3 wherein the geometric shape of each mold is that of a diamond.

5. A belt according to claim 4 wherein the longitudinal ends of each mold member are arranged so as to permit freedom of movement between said transverse rows.

6. A belt according to claim 5 wherein said ends have concave outer surfaces.

7. An endless conveyor belt for making sponge rubber padding comprising a plurality of mold members having a substantially closed bottom and upwardly extending sidewalls defining an upwardly facing mold cavity, said members being arranged in a plurality of transverse rows, and means hingedly interconnecting said rows, the members of one row overlapping longitudinally of said belt the members of adjacent rows, said means for hingedly interconnecting said rows including a rod extending transversely of the belt through the overlapping side walls of said members, the side walls of said members being in a diamond-shaped form.

8. The belt of claim 7 wherein the longitudinal ends of said members adjacent the base are relieved to permit free hinging movement.

References Cited

UNITED STATES PATENTS

| | | | |
|---|---|---|---|
| 1,650,981 | 11/1927 | Crouch | 25—99 XR |
| 1,772,423 | 8/1930 | Hurxthal | 25—99 XR |
| 2,545,366 | 3/1951 | Mandryl | 25—99 |
| 3,230,901 | 1/1966 | Zones. | |

WILLIAM J. STEPHENSON, *Primary Examiner.*

U.S. Cl. X.R.

25—99